United States Patent Office 3,465,040
Patented Sept. 2, 1969

3,465,040
2,3-DECAMETHYLENE-CYCLOPENTANONE
Hitosi Nozaki, Osaka, Ryoji Noyori, Kobe-shi, and Takashi Mori, Kyoto, Japan, assignors to Chugai Seiyaku Kabushiki Kaisha, Tokyo, Japan, a corporation of Japan
No Drawing. Filed Dec. 29, 1967, Ser. No. 694,414
Int. Cl. C07c 49/28
U.S. Cl. 260—586    1 Claim

ABSTRACT OF THE DISCLOSURE

The compound 2,3-decamethylene-cyclopentanone, having a musk-like and white sandal wood-like odor and useful for perfume, is obtained by reducing 2,3-decamethylene-2-cyclopentenone.

---

This invention relates to 2,3-decamethylene-cyclopentanone, also named 13-ketobicyclo[10.3.0]pentadecane. Because of its musk-like and wood-like especially white sandal wood-like odor, this compound is useful as perfumery.

The compound of this invention is prepared by reducing 2,3-decamethylene-2-cyclopentenone and the reaction is shown as follows:

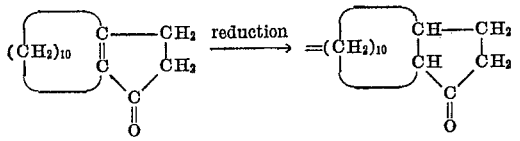

Catalytic reduction is the preferred method of carrying out the above reduction. However, the other reduction method using a reducing agent may be used as well.

The production of the compound is more fully explained as follows:

Catalytic reduction in alcohols or ethers give most preferable results. The catalyst used may be a general one, for example, palladium on carbon, Raney nickel, platinum black, palladium on calcium carbonate, palladium on barium carbonate, palladium on strontium carbonate and the like, of which it is preferable to use palladium on carbon or Raney nickel. The pressure of the hydrogen gas and the reaction temperature are not critical and atmospheric pressure and room temperature (about 25° C.) may be used. The novel compound is also obtained by reducing 2,3-decamethylene-2-cyclopentenone using metallic lithium in liquid ammonia, metallic sodium in liquid ammonia or zinc dust in acetic acid, etc.

The thus obtained 2,3-decamethylene-cyclopentanone is a new compound and gave correct elemental analysis. The infrared absorption spectrum showed carbonyl absorption at 1,760 cm.$^{-1}$, characteristic to cyclopentanones, but no absorptions at 1,690 and 1,630 cm.$^{-1}$, due to cyclopentenones.

The 2,3-decamethylene-2-cyclopentenone starting material used in the above process was prepared as follows.

Stobbe condensation of cyclododecanone with diethyl succinate gave crude Stobbe's halfesters, which was treated with hydrobromic acid to produce crystalline paraconic acid. Heating with phosphorus pentoxide provided dehydration and simultaneous decarboxylation to yield the 2-cyclopentenone.

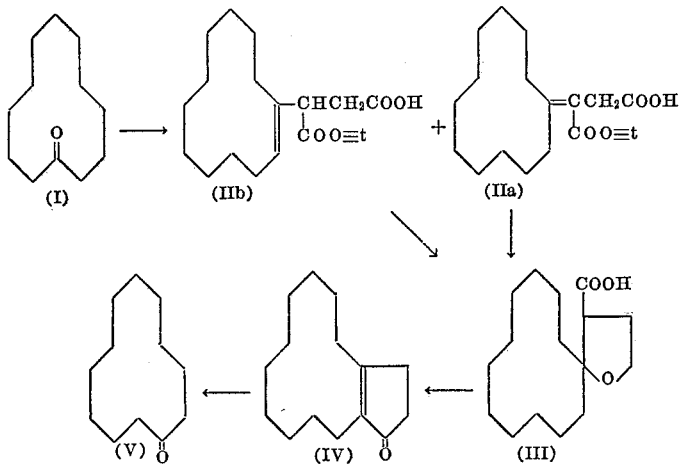

(I) cyclododecanone
(II) Stobbe's halfesters
(III) paraconic acid
(IV) 2,3-decamethylene - 2 - cyclopentenone(or bicyclo [10.3.0]-Δ-pentadecanone-13)
(V) 2,3 - decamethylene - cyclopentanone(or 13 - ketobicyclo[10.3.0]pentadecane or bicyclo[10.3.0]pentadecanone-13)

Example 1

To a solution of 5 g. of 2,3-decamethylene-2-cyclopentenone in 20 ml. of ethanol was added 5 ml. of 10% palladium on carbon. The mixture was shaken vigorously under atmospheric pressure of hydrogen for 20 hours. After the reaction was completed, the catalyst was removed by filtration and the filtrate was concentrated. Distillation under reduced pressure gave 5 g. of oily 2,3-decamethylene-cyclopentanone. M.P. 150° C./0.1 mm. Hg.

*Elemental analyses.*—Calc. for $C_{15}H_{26}O$: C, 81.02%; H, 11.78%. Found: C, 80.95%; H, 11.70%.

The compound was converted to 2,4-dinitrophenylhydrazone. M.P. 147.5–148° C.

Example 2

To a solution of 4 g. of 2,3-decamethylene-2-cyclopentenone in 20 ml. of dioxane was added 3 ml. of Raney nickel (W-2). The mixture was shaken under hydrogen at normal pressure for 20 hours. After absorption of hydrogen gas had ceased, the catalyst was removed by filtration and the filtrate was concentrated. Distillation under reduced pressure gave 3.6 g. of oily 2,3-decamethylene-cyclopentanone. M.P. 147–150° C./0.1 mm. Hg.

Example 3

A solution of 1 g. of 2,3-decamethylene-2-cyclopentenone in 10 ml. of anhydrous ether was added to 50 ml. of liquid ammonia containing 0.5 g. of metallic lithium in the course of 15 minutes and kept overnight. Resulting mixture was decomposed by aqueous ammonium chloride and extracted with ether. Removal of the solvent followed by distillation under reduced pressure gave 0.7 g. of oily 2,3-decamethylene-cyclopentanone. M.P. 145–150° C./0.1 mm. Hg.

Example 4

A mixture of 1 g. of 2,3-decamethylene-2-cyclopentenone, 30 ml. of acetic acid and 4 g. of zinc dust was heated at reflux for 2 hours. After the reaction was completed, the mixture was treated with water and extracted with ether. Ether was removed and the residual oily substance was purified by column chromatography using silica gel to give 0.3 g. of oily 2,3-decamethylene-cyclopentanone. M.P. 145–150° C./0.1 mm. Hg.

It will be obvious to those skilled in the art that various changes may be made without departing from the scope of the invention and the invention is not to be considered limited to what is described in the specification.

What is claimed is:

1. 2,3-decamethylene-cyclopentanone.

No references cited.

LEON ZITVER, Primary Examiner

M. M. JACOB, Assistant Examiner

U.S. Cl. X.R.

252—522; 260—346.2, 468

PO-1050
(5/69)

UNITED STATES PATENT OFFICE
CERTIFICATE OF CORRECTION

Patent No. 3,465,040     Dated September 2, 1969

Inventor(s) NOZAKI et al

It is certified that error appears in the above-identified patent and that said Letters Patent are hereby corrected as shown below:

In the printed patent, column 2, line 41, change:

" 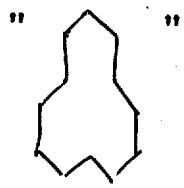 "

to -- 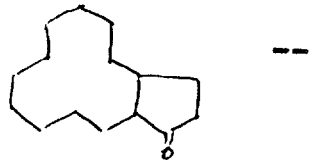 --

(Compares to page 3, line 2 of the typewritten specification)

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents